US00RE44084E

(19) United States
(12) Reissued Patent
Kern et al.

(10) Patent Number: US RE44,084 E
(45) Date of Reissued Patent: Mar. 19, 2013

(54) CONTROL SYSTEM FOR STAND-BY ELECTRICAL GENERATOR

(75) Inventors: Robert D. Kern, Waukesha, WI (US); Steven J. Wilcox, Delafield, WI (US); Gerald C Ruehlow, Oconomowoc, WI (US); Frank X. Wedel, Lake Mills, WI (US); Graham McLean, Lymm (GB); Phillip Harrison, Lymm (GB); Hongping Zhou, Preston (GB)

(73) Assignee: Generac Power Systems, Inc., Waukesha, WI (US)

(21) Appl. No.: 13/419,193

(22) Filed: Mar. 13, 2012

Related U.S. Patent Documents

Reissue of:
(64) Patent No.: 6,657,416
Issued: Dec. 2, 2003
Appl. No.: 09/882,745
Filed: Jun. 15, 2001

(51) Int. Cl.
*H02P 15/00* (2006.01)
*H02P 3/00* (2006.01)

(52) U.S. Cl. ..... 322/29; 290/40 A; 290/40 R; 290/40 B; 307/7; 307/8; 307/57; 307/64; 322/10; 322/12

(58) Field of Classification Search ..... 322/10, 322/12, 29; 290/40 A, 40 B, 40 R; 307/7, 307/8, 57, 64
See application file for complete search history.

(56) References Cited

U.S. PATENT DOCUMENTS 4,204,249 A * 5/1980 Dye et al. ..... 307/64
4,357,545 A * 11/1982 Le Grand et al. ..... 307/130
4,651,019 A * 3/1987 Gilbert et al. ..... 307/43
4,967,096 A * 10/1990 Diemer et al. ..... 290/38 R
5,323,328 A 6/1994 Tanaka
5,461,263 A * 10/1995 Helfrich ..... 307/64
5,465,011 A * 11/1995 Miller et al. ..... 307/64
5,612,580 A * 3/1997 Janonis et al. ..... 307/64
5,619,077 A * 4/1997 Green et al. ..... 307/38
5,706,207 A 1/1998 Kurten et al.
5,734,255 A 3/1998 Thompson et al.
5,754,033 A * 5/1998 Thomson ..... 307/57
5,973,481 A * 10/1999 Thompson et al. ..... 290/2
6,351,692 B1 2/2002 Eaton et al.
6,633,799 B2 10/2003 Krakovich et al.
6,697,951 B1 2/2004 Sinha et al.

OTHER PUBLICATIONS

"Entelligent NST Bind 3.1—A LonWorks binding tool for enpower controls", Encorp, Inc., Windsor, CO, Jun. 18, 2011, 96 pages.
Generac, Owner's Manual, DG 50 Genset, OC6147rev0, Jun. 6, 2001.
Generac, Owner's Manual, DG 50 Genset, OD2773rev0, Apr. 16, 2001.
Generac, Owner's Manual, DG 50 Genset, C7363rev2, Feb. 28, 2001.
Generac, Owner's Manual, DG 50 Genset, OE3611revB, Nov. 11, 2003.
Generac, Owners Manual, DG 50 Genset, OD9102revC, Aug. 26, 2003.
Generac, Owner's Manual, DG 50 Genset, OD8944revC, Aug. 26, 2003.
"Generator System Monitoring And Control For Window", Kohler Power Systems, G6-38, Sep. 1998, 6 pages.

(Continued)

*Primary Examiner* — J. San Martin
(74) *Attorney, Agent, or Firm* — Boyle Fredrickson, S.C.

(57) ABSTRACT

A generator structure is provided for generating an AC power for a load. The generator structure includes a generator connectable to a load and an engine operatively connected to the generator for driving the same. A generator controller is operatively connected to the engine for controlling operation thereof and operatively connected to a generator for controlling the AC power generated thereby. A communications link connects the generator control to a network.

21 Claims, 11 Drawing Sheets

OTHER PUBLICATIONS

"Application of PLC's In Engine Generator Control Switchgear", Forste, Presentation for E.G.S.A., Cancun, Mexico, Sep. 19, 1995, 30 pages.
"Enpower-GPC Generator Power Control" Product Data Sheet, Encorp, Inc. 621 Ennovation Circle, Suite D, Windsor, CO 80550, 1996-1997, 4 pages.
"Enpower-MMC Meter/Monitor Control" Product Data Sheet, Encorp, Inc. 621 Ennovation Circle, Suite D, Windsor, CO 80550, 1996-1997, 4 pages.
"Enpower—UPC Utility Power Control" Product Data Sheet, Encorp, Inc. 621 Ennovation Circle, Suite D, Windsor, CO 80550, 1996-1997, 4 pages.
"Entelligent", http://encorp.com/html/entelligent.html, 1 page, Dec. 1997.
"Advanced, Utility-Grade Power Control Products", http://encorp.com/html/power_control.html, 2 pages, Dec. 1997.
The entelligent—VMM (Virtual Maintenance Monitor™), http://www.encorp.com/products/products_software/vmm/v . . . , May 2000, 2 pages.
"What is our Virtual Power Plant Solution", http://encorp.com/html/vpp_solution.html, 2 pages, Dec. 1997.
"The Encorp Virtual Power Plant Solution", Encorp, Inc. Windsor CO, 10 pages, Jun. 2012.
"'Peak Sharing' A Win-Win Solution to Reliably and Cost-Effectively Reduce System Peak Demands", http://encorp.com/html/win-win.html, Jan. 1998, 7 pages.
"New Products from Woodward", http://www.woodward.com/engine/newprod.htm, Jun. 2012, 2 pages.
"Entelligent VPP", Encorp, Inc., Windsor, CO, Oct. 9, 2000, 32 pages.
"Energy Automation Tools—A Suite of Programs for Configuring and Monitoring Empower Controls", Encorp, Inc., Windsor, CO, Apr. 25, 2000, 262 pages.
"Enpower Developers Guide—Building Custom Applications with enpower Controls", Encorp, Inc., Windsor, CO, Jun. 1, 2000, 450 pages.
"Enpower Hardware—A guide to enpower controls: revision 2.0 and above", Encorp., Inc., Windsor, CO, Jun. 1, 2000, 72 pages.
"Encorp, Inc. The Energy Automation Company", PowerPoint, 15 pages, undated.
"Release Notes for Enpower 3.0 Firmware Development—Date: Aug. 3, 2000—Control Platform: Revision 2 hardware" , Encorp, Inc., Windsor, CO.
"Gilder Group's Inaugural Powercosm Conference—the Virtual Power Plant in the Powercosm", PowerPoint, Coronado Island, CA—Jun. 15, 2000, 43 pages.
"Entelligent—VMM—Virtual Maintenance Monitor Software User Guide", Encorp, Inc., Windsor, CO, Jun. 22, 2012, 24 pages.
"Enpower-GPC with kW Sharing Software—User Guide—Standard Binding Set", Encorp, Inc., Windsor, CO, Feb. 27, 1998, 55 pages.
"Enpower Products, GPC/MMC/UPC, Installation And Configuration Guide", Encorp, Inc., Windsor, CO, Dec. 3, 1998, 50 pages.
"Entelligent NST Binding Software 3.0, LonWorks Binding Tool for enpower Controls", Encorp, Inc. Windsor, CO, Aug. 4, 1999, 95 pages.
"Virtual Maintenance Monitor—Developers Guide", Encorp, Inc., Windsor, CO, Aug. 14, 2001, 268 pages.
"Power Command Network—Smart Products, Intelligent Systems, Powerful Solutions", Onan Corporation, Sep. 1995 Bulletin PCN-007, 8 pages.
"Utility Deregulation and The Role of Standby Generators", Whitham, Jeff, Encorp. Inc., Power-Gen '96, Orlando, FL, Dec. 5, 1996, 4 pages.
"Integrated Gen-Set Controls For Peak Sharing Applications", Whitman, Diesel Progress Engines & Drives, May 1996, 2 pages.
"'Peak Sharing'—A Win-Win Solution to Reliably and Cost-Effectively Reduced System Peak Demands", Whitman, Encorp, Inc., Windsor, CO, undated, 8 pages.
"Enpower Hardware—A guide to enpower controls" revisins 2.0 and above, Encorp, Inc., Windsor, CO, Nov. 2, 2000, 81 pages.
"The Encorp Virtual Power Plan Solution", Slideshow, Jun. 4, 2012, 19 pages.
Drawings by Greg Miller, Encorp, Inc., Windsor, CO, Oct. 30, 1997, 3 pages.
"PowerCommand Paralleling Generator Set Control", Onan Corporation, Jan. 1996 Bulletin S-1005, 6 pages.
"Enpower Training Course" May 1-5, 1999, Slideshow, 51 pages.
"Arizona Corporation Commission Distributed Generation & Interconnection Workgroup Meeting—The Business Care for the Virtual Power Plant", Slideshow, Phoenix, AZ, Oct. 25, 1999, 47 pages.
"Energy Automation Tools—A suite of programs for configuring and monitoring enpower controls", Encorp, Inc., Apr. 30, 2000, 254 pages.
"Entelligent VPP Virtual Power Plant", Encorp, Inc., Nov. 3, 1999, 48 pages.
"Closed Transition Soft Load Automatic Transfer Switches Free Standing 800-4000 Amperes", Cutler-Hammer, Inc., 1999, 8 pages.
"Awaiting the Much Anticipated Arrival of Micro-generation?—An automotive-based engine—redesigned to be an efficient, durable natural-gas-fired genset—shows promise to become one of the first commercially available micro-generators", Salter et al, Prime Power, Consulting-Specifying Engineer's 1998, EGSA Supplement, 10 pages.
"Woodward Governor Company Engine Controls 1996 Complete Line Catalog", Woodward Engine Controls, 1995, 105 pages.
"EGCP-1 Engine Generator Control Package" Product Specification 03208, 99/10/F, Woodward, Fort Collins, CO, 1999, 4 pages.
"Wexler manufacturers powerful genset controllers!", www.wexler.co.il, Jun. 21, 2012, 2 pages.
"Software Operation, Monitoring and Control for Windows(r)—Decision-Maker 340 Genset Controller, M340 Transfer Switch Controller, M340+ Transfer Switch Controller, PM340 Power Monitor", Kohler Power Systems, TP-5972, Dec. 1998, 60 pages.
"Instructions for Cutler-Hammer Closed Transition Soft Load Generator Control Logic", IB4502TE0002, Cutler-Hammer, May 2001, 108 pages.
"Kohler Power Systems Selects Encorp Control System", http://encorp.com/newsroom/press_kohler/body_press_kohle . . . , Feb. 1, 2011, 2 pages.
"Onan PowerCommand Digital Paralleling: First, a breakthrough GenSet. Now, an innovation application." , Onan Corporation, Minneapolis, MN, Bulletin F-1122 Jul. 1995, 4 pages.
"PowerCommand Network—Real Time Monitoring and Control for Emergency Power Systems", Onan Corporation, Minneapolis, MN 55432, R-1089a, Oct. 1996, 2 pages.

* cited by examiner

CONTROL SYSTEM FOR STAND-BY ELECTRICAL GENERATOR

Matter enclosed in heavy brackets [ ] appears in the original patent but forms no part of this reissue specification; matter printed in italics indicates the additions made by reissue.

FIELD OF THE INVENTION

This invention relates generally to engine driven, electrical generators, and in particular, to a control system for controlling operation of the engine and the electrical generator driven therewith.

BACKGROUND AND SUMMARY OF THE INVENTION

Electrical generators are used in a wide variety of applications. As is conventional, electrical generators utilize a single driving engine coupled to a generator or alternator through a common shaft. Upon actuation of the engine, the crankshaft rotates the common shaft so as to drive the alternator which, in turn, generates electrical power.

Typically, an individual electrical generator operates in either a stand-by mode or a parallel mode. In the stand-by mode, the electrical power provided by a utility is monitored such that if the commercial electrical power from the utility fails, the engine of the electrical generator is automatically started causing the alternator to generate electrical power. When the electrical power generated by the alternator reaches a predetermined voltage and frequency desired by the customer, a transfer switch transfers the load imposed by the customer from the commercial power lines to the electrical generator.

Alternatively, in the parallel mode, the electrical generator supplies electrical power in parallel with the utility grid. As such, the electrical power generated by the electrical generator must be synchronized with the commercial electrical power supplied by the utility. Typically, multiple items such as governors, voltage regulators and the like are required to synchronize the electrical power generated by the electrical generator with the commercial electrical power supplied by the utility. This additional equipment is provided in separate cabinet units from the electrical generator itself, which adds significantly to the cost of the electrical generator.

Therefore, it is a primary object and feature of the present invention to provide an electrical generator incorporating a control system which controls operation of the electrical generator in a stand-by mode or a parallel mode.

It is a further object and feature of the present invention to provide an electrical generator which has the ability to supply electrical power to a load independent of the utility grid, or which may supply electrical power in parallel with the utility grid.

It is a still further object and feature of the present invention to provide an electrical generator which is simple to operate and less expensive to manufacture than prior electrical generators.

In accordance with the present invention, a control system is provided for controlling operation of an engine driven, electrical generator. The electrical generator generates AC power and AC voltage for a load. The AC power has a magnitude and a power factor and the AC voltage has a magnitude and a frequency. The control system includes a generator control operatively connected to the engine for controlling operation thereof and operatively connected to the generator for controlling the AC power generated thereby. A communications link operatively connects the generator control to a network.

A user interface is operatively connected to the network. The user interface allows the user to communicate with the generator control so as set predetermined operating parameters of the engine and the generator.

The control system may include a transfer switch having a first input connectable to a utility source for providing AC power, a second input operatively connected to the generator, and an output connectable to the load. The transfer switch is selectively movable between a first position connecting the utility source to the load and a second position connecting the generator to a load. The transfer switch is also operatively connected to the generator control such that the generator control controls movement of the transfer switch between the first and second positions.

It is contemplated to interconnect the load to a utility source which provides AC power having a magnitude and a power factor and AC voltage having a magnitude and a frequency. The control system includes a synchronizer for determining the magnitude and frequency of the AC voltage of the utility source and a magnitude and frequency of the AC voltage generated by the generator. The synchronizer is operatively connected to the generator control. The generator control varies the magnitude and frequency of the AC voltage generated by the generator to match the magnitude and frequency of the AC voltage provided by the utility source. A switch is operatively connected to the generator control and is movable between a first closed position for interconnecting the generator and the load and a second open position. The generator control moves the switch to the closed position in response to the magnitude and frequency of the AC voltage generated by the generator being generally equal to the magnitude and frequency of the AC voltage provided by the utility source.

The generator control may include a digital governor connectable to the engine for controlling the engine speed of the engine. The digital governor includes a throttle valve movable between a first opened position where the engine speed is at maximum and a second closed position where the engine speed is at minimum. The generator control may also include a volt-ampere-reactive (VAR) control for varying the power factor of the AC power generated by the generator to the predetermined level. In addition, the generator control includes a voltage regulator for controlling the magnitude of the AC voltage generated by the generator. An alarm system is connectable to the engine for monitoring various engine parameters. The alarm system communicates with the generator control and generates an alarm signal in response to a predetermined condition on the engine.

In accordance with a further aspect of the present invention, a generator structure is provided for generating AC power for a load. The generator structure includes a generator connectable to a load. The generator generates AC power having a magnitude and a power factor and an AC voltage having a magnitude and a frequency. An engine is operatively connected to the generator for driving the generator. The engine has an adjustable engine speed. A generator control is operatively connected to the engine for controlling operation thereof and is operatively connected to the generator for controlling AC power generated thereby. A communications link operatively connects the generator control to a network.

The generator structure may include a transfer switch having a first input connectable to a utility source for providing AC power, a second input operatively connected to the generator and an output connectable to the load. The transfer switch is selectively movable between a first position for connecting the utility source to the load and a second position for connecting the generator to the load. The transfer switch is operatively connected to the generator control such that the generator control controls movement of the transfer switch between first and second positions in response to AC power supplied by the utility source.

It is contemplated that the load be a utility source which provides AC power having a magnitude and a power factor and an AC voltage having magnitude and a frequency. The generator control includes a synchronizer for monitoring the magnitude and frequency of the AC voltage provided by the utility source and a magnitude and frequency of the AC voltage generated by the generator. The generator control varies the magnitude and frequency of the AC voltage generated by the generator to match the magnitude and frequency of the AC voltage of the utility source. The generator control may also include a volt-ampere-reactive (VAR) control for varying the power factor of the AC power generated by the generator.

A switch may be operatively connected to the generator control and be movable between a first closed position wherein the generator is connected to the utility source and a second open position. The generator control moves the switch to the closed position in response to the magnitude and frequency of the AC voltage generated by the generator being generally equal to the magnitude and frequency of the AC voltage provided by the utility source. The generator control includes a digital governor connected to the engine for controlling the engine speed of the engine. The digital governor includes a throttle valve which is movable between a first open position wherein the engine speed is at a maximum and a second closed position wherein the engine speed is at a minimum. A generator control includes a voltage regulator for regulating the magnitude of the AC voltage generated by the generator.

In accordance with a still further aspect of the present invention, a method is provided for providing AC power to a load. The method includes the steps of setting various operating parameters for a generator structure and transmitting the same to the generator structure over a network. AC power and AC voltage are generated with the generator structure in response to the various operating parameters set. The AC power has a magnitude and a power factor and the AC voltage has a magnitude and a frequency.

It is contemplated that the load be a utility source which provides AC power having a magnitude and a power factor and AC voltage having a magnitude and a frequency. The method includes the additional step of monitoring the magnitude and frequency of the AC voltage provided by the utility source and the magnitude and frequency of the AC voltage generated by the generator structure. The magnitude and frequency of the AC voltage generated by the generator structure is varied so as to match the magnitude and frequency of the AC voltage provided by the utility source. The generator structure and the utility source are interconnected in response to the magnitude and frequency of the AC voltage generated by the generator structure be generally equal to the magnitude and frequency of the AC voltage provided by the utility source.

In addition, the power factor of the AC power generated by the generator structure may be varied to a predetermined level and the AC voltage generated by the generator structure may be adjusted to a user selected magnitude.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
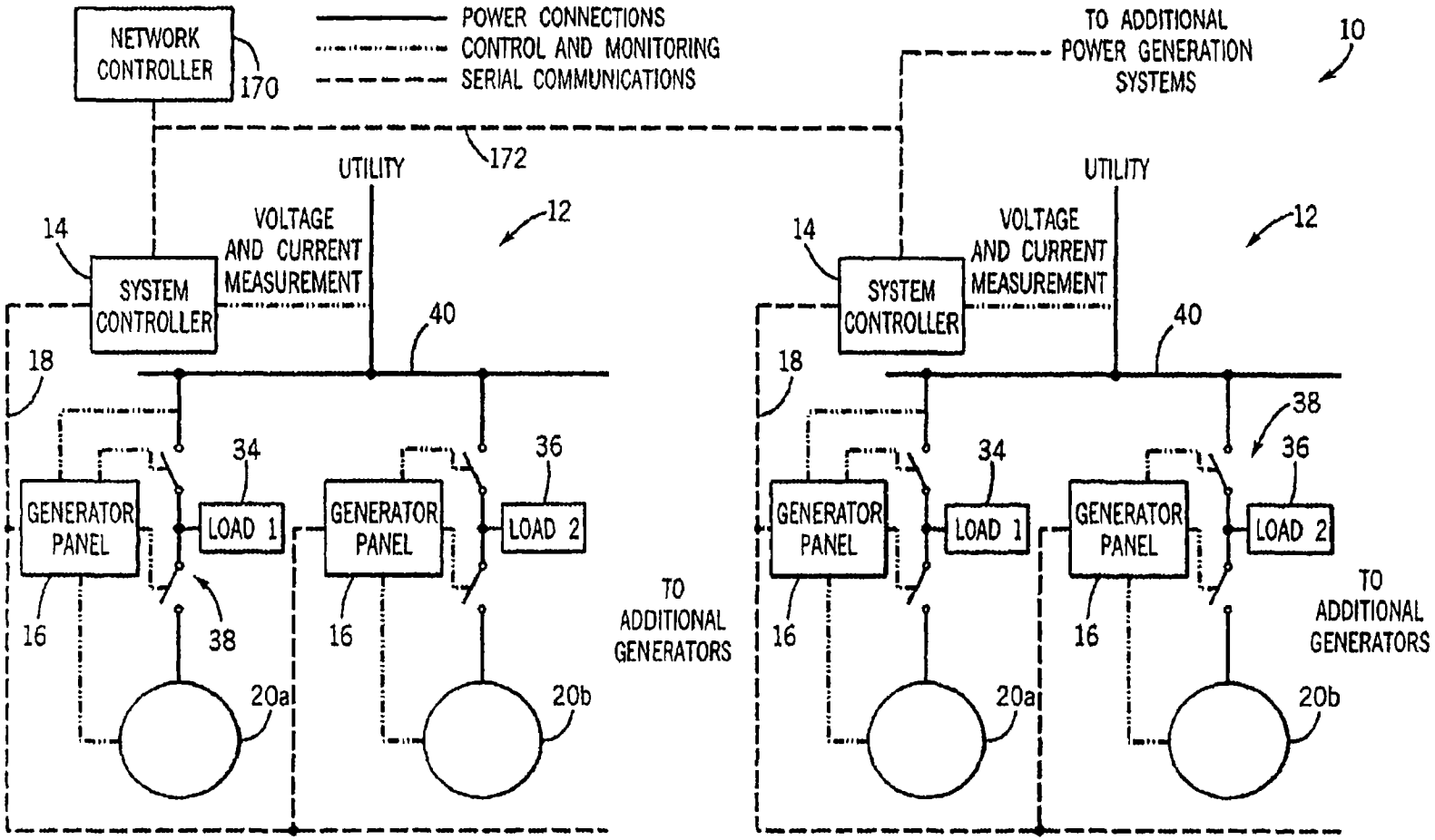
FIG. 1 is a schematic view of a network system for controlling and managing the distribution of electrical power.

Referring to FIG. 1, a network control system for controlling and monitoring a plurality of power generation systems is generally generated by the reference numeral 10. Each of the power generation systems is generally designated by the reference numeral 12. Each power generation system includes system controller 14 operatively connected to a plurality of generator panels 16 by serial communications link 18. Each generator panel 16 is operatively connected to a corresponding generator 20a and 20b, as hereinafter described.

Figure 4A:
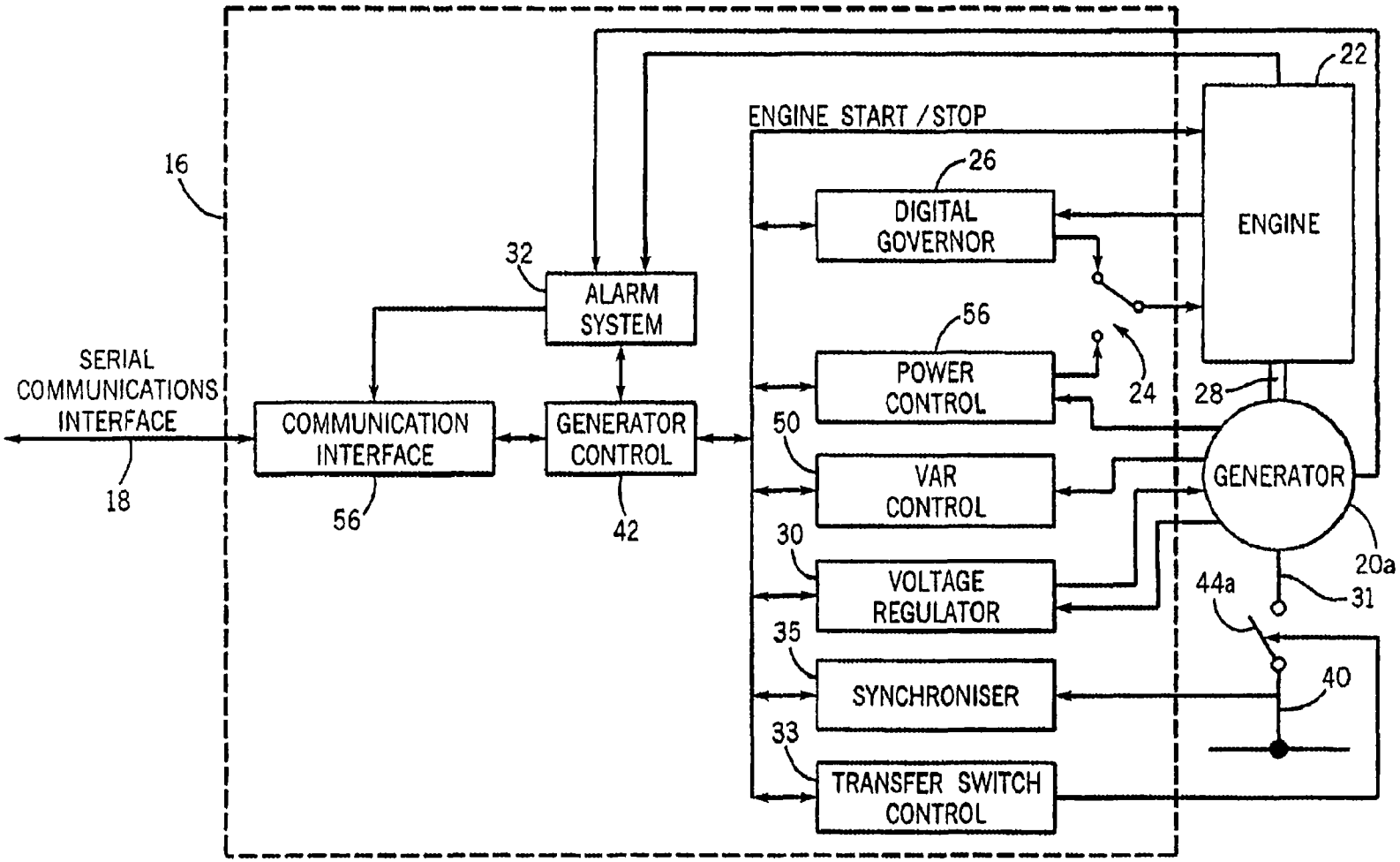
FIG. 4a is a schematic view of a generator structure for generating electrical power for the power generation system of FIG. 3.
Figure 4B:
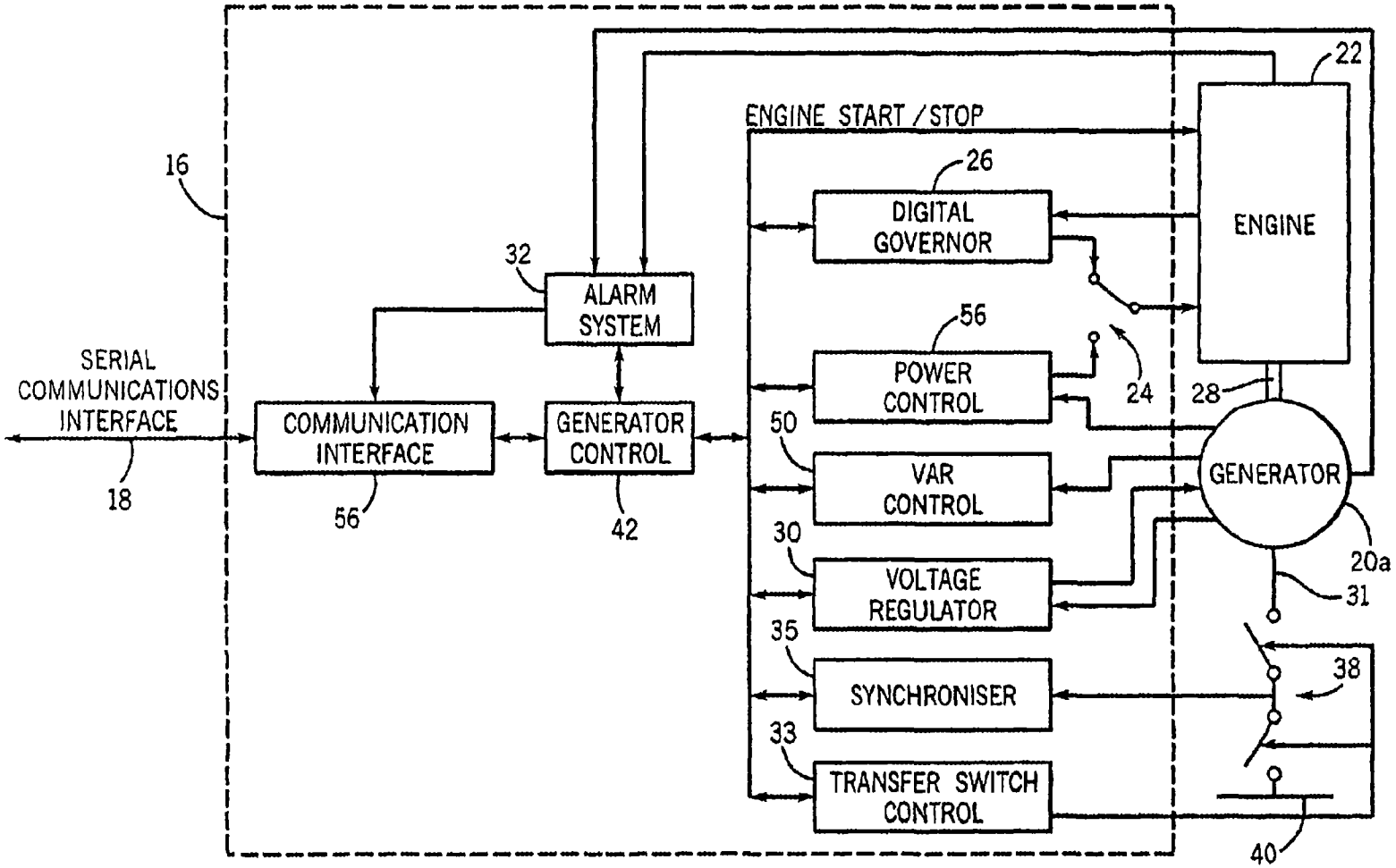
FIG. 4b is a schematic view of the generator structure of FIG. 4a for the power generation system of FIG. 2.

As best seen in FIGS. 4a-4b, generator panel 16 is operatively connected an engine 22 and a corresponding generator 20a or 20b. It can be appreciated that the following description of generator panel 16 operatively connected to generator 20a will be understood to describe a second generator panel 16 operatively connected to generator 20b, as if fully described herein. Engine 22 receives fuel such as natural gas or liquid propane vapor through an intake. The fuel provided to engine 22 is compressed and ignited within the cylinders thereof so as to generate reciprocating motion of the pistons of engine 22. The reciprocating motion of the pistons of engine 22 is converted to rotary motion by a crankshaft. The crankshaft is operatively coupled to generator 20a through shaft 28 such that as the crankshaft is rotated by operation of engine 22, shaft 28 drives generator 20a which, in turn, converts the mechanical energy by engine 22 to electrical power on output 31 of generator 20a for transmission and distribution.

Digital governor 26 is operatively connected to throttle 24 which controls the volume of intake air to engine 22. As is known, digital governor 26 protects engine 22 from overspeed conditions and maintains engine 22 at a desired engine speed which, in turn, causes generator 20a to generate a desired electrical power at a desired frequency. Digital governor 26 controls the engine speed of engine 22 by regulating the position of throttle 24, and hence, the amount of fuel and air provided to the combustion chamber of engine 22. As is known, throttle 24 is movable between a wide-open position wherein engine 22 runs at full power and a closed position wherein engine 22 runs at minimum power. Generator control 42 controls operation of digital governor 26, and hence, throttle 24, as hereinafter described.

As is conventional, generator 20a generates AC voltage having a magnitude and a frequency and AC current having a magnitude and a frequency. In alternating current power transmission and distribution, the cosine of the phase angle (θ) between the AC voltage and the AC current is known as the power factor. The AC power generated by generator 20a may be calculated in according to the expression:

$$P=I\times V\times \cos\theta$$

wherein P is the AC power; I is the root means square of the AC current; and V is the root means square of the AC voltage.

The magnitude of the AC output voltage of generator 20a is monitored by voltage regulator 30. As is conventional, generator 20a includes an armature winding or exciter which controls the magnitude of the AC output voltage of generator 20a. Voltage regulator 30 acts to increase or decrease the excitation of the exciter of generator 20a to the degree needed to maintain the magnitude of the AC output voltage at a desired value.

It is contemplated to operatively connect engine 22 and generator 20a to an alarm system 32. Alarm system 32 monitors various operating conditions of engine 22 and generator 20a and provides a warning if any of the operating conditions fall outside normal operating levels. In addition, alarm system 32 is operatively connected to generator control 42 such that generator control 42 may shut down generator 20a in response to certain, predetermined alarm conditions on engine 22 and/or generator 20a so as to prevent damage to power generation system 12.

Figure 2:
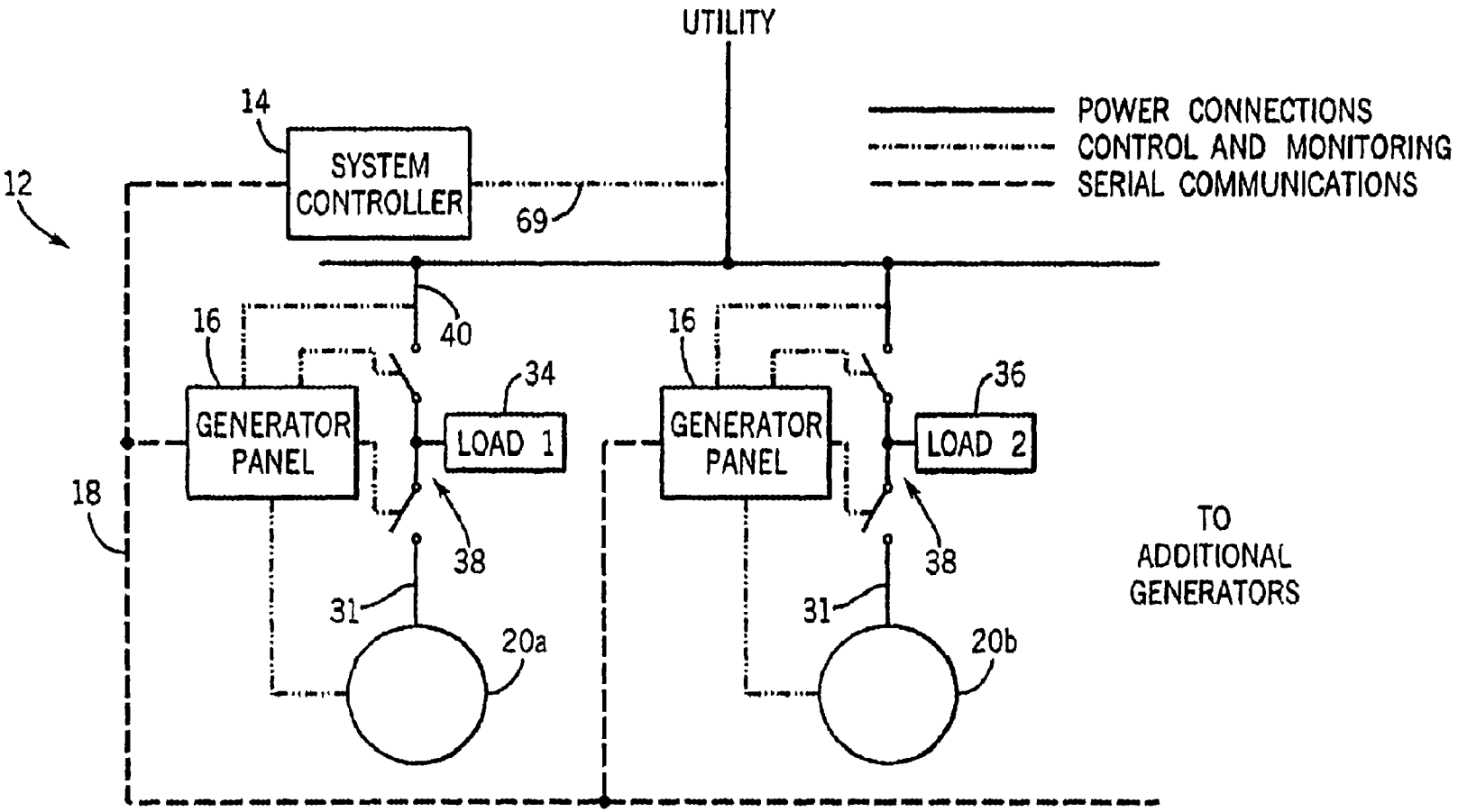
FIG. 2 is a schematic view of a first embodiment of a power generation system.

Referring to FIGS. 2 and 4b, it is contemplated to connect generators 20a and 20b to corresponding loads 34 and 36, respectively, through corresponding transfer switches 38. Each transfer switch 38 isolates the electrical power supplied by a utility on supply line 40 from the electrical power supplied at outputs 31 of corresponding generators 20a and 20b. Electrical power supplied on supply line 40 is monitored such that if the electrical power from the utility fails, engines 22 are started by generator controls 42, FIG. 4b, in a conventional manner. With engines 22 of power generation systems 12 started, generators 20a and 20b generate electrical power, as heretofore described. When the electrical power generated by generators 20a and 20b reaches the magnitude and frequency desired by the user, generator control 42 through transfer switch control 33 causes transfer switches 38 to transfer loads 34 and 36 from supply line 40 to corresponding outputs 31 of generators 20a and 20b, respectively. In response to restoration of electrical power on supply line 40 by the utility, generator controls 42 through transfer switch controls 33 cause transfer switches 38 to transfer loads 34 and 36 from outputs 31 of generators 20a and 20b, respectively, to supply line 40. Thereafter, engines 22 are stopped by corresponding generator controls 42. By stopping engines 22, generators 20a and 20b no longer generate electrical power.

Figure 3:
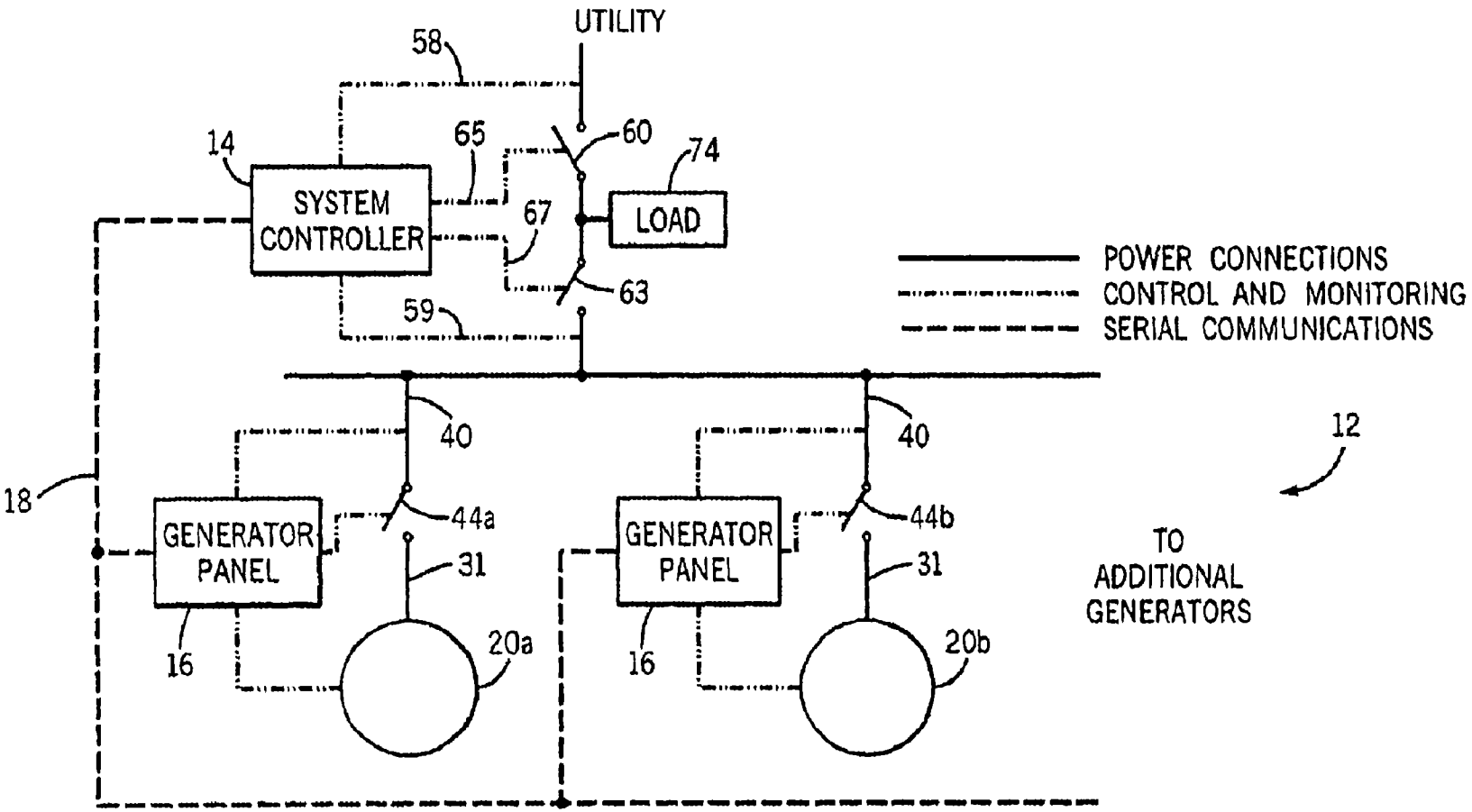
FIG. 3 is a schematic view of a second embodiment of a power generation system.

Alternatively, referring to FIGS. 3 and 4a, in the event of a power outage, generators 20a and 20b may be put in parallel with each other in order to supply electrical power to load 74. Generators 20a and 20b are put in parallel with each other by connecting outputs 31 of generators 20a and 20b to supply line 40. However, prior to connecting outputs 31 of generators 20a and 20b to supply line 40, it is necessary to match the magnitude of the AC output voltage of generator 20a with the magnitude of the AC output voltage of generator 20b. In addition, the outputs of generators 20a and 20b must be synchronized. In order to synchronize the outputs of generators 20a and 20b, the phase sequences and the frequencies of the outputs of generators 20a and 20b must be identical. Once synchronized, generator control 42 through transfer switch control 33 causes transfer switches 44a and 44b to close such that outputs 31 of generators 20a and 20b, respectively, are coupled to supply line 40. Thereafter, supply line 40 is connected to load 74, as hereinafter described.

It is also contemplated to put generators 20a and 20b in parallel with the utility by connecting outputs 31 of generators 20a and 20b to the utility. In order to put generators 20a and 20b in parallel with the utility, it is necessary to match the magnitude of the AC output voltages of generators 20a and 20b with the magnitude of the AC voltage of the utility. In addition, the outputs of generators 20a and 20b must be synchronized with the utility. In order to synchronize the outputs of generators 20a and 20b with the utility, the phase sequences and the frequencies of the outputs of generators 20a and 20b must be identical in phase and frequency with the utility.

Referring back to FIGS. 4a and 4b, by way of example, voltage matching is accomplished by voltage regulators 30 of generator panels 16. Each voltage regulator 30 is supplied with the magnitude of the AC voltage provided by the utility, as hereinafter described, and thereafter, raises or lowers the AC voltage provided by corresponding generators 20a or 20b to precisely match the magnitude of the AC voltage provided by the utility under the control of corresponding generator controls 42 of generator panels 16. As such, it is contemplated to operatively connect generator controls 42 of generator panels 16 to supply line 40 to monitor the utility. Synchronization is achieved by increasing or decreasing the engine speed, as heretofore described, such that phase sequence and the frequency of the AC outputs of generators 20a and 20b are identical to the phase and frequency supplied by the utility. Synchronizers 35 monitor the AC power provided by the utility and provide such information to corresponding generator controls 42. Once synchronization is achieved, transfer switches 44a and 44b are closed by generator controls 42 through transfer switch controls 33 such that outputs 31 of generators 20a and 20b, respectively, are coupled to supply line 40. Thereafter, supply line 40 is connected to the utility, as hereinafter described.

When generators 20a and 20b are connected in parallel with the utility, the AC output voltages of generators 20a and 20b cannot be varied by excitation of corresponding exciters of generators 20a and 20b. Excitation of exciters of generators 20a and 20b controls the power factors of the electrical power supplied by generators 20a and 20b to the utility. As such, the excitation of exciters of generators 20a and 20b when generators 20a and 20b are connected in parallel with the utility is known as volt-ampere-reactance (VAR) control, block 50.

Further, when generators 20a and 20b are connected in parallel with the utility, the opening and closing of throttles 24 by digital governors 26 does not change the engine speeds of corresponding engines 22. The opening and closing of throttles 24 increases the AC power supplied to the utility by generators 20a and 20b. As such, the opening and closing of throttles [34] *24* when generators 20a and 20b are connected in parallel with the utility is known as power control, block 52.

Generator controls 42 of the generator panels 16 are operatively connected to serial communications link 18 by communication interfaces 56. In the preferred embodiment, each communication interface 56 is a RS485. Referring to FIGS. 2 and 3, serial communications link 18 allows system controller 14 to communicate with generator controls 42 of generator panels 16. System controller 14 includes a microcontroller and a visual display. The microcontroller executes a software program which is displayed on the visual display of system controller 14. The software program allows a user to monitor the electrical power supplied by the utility; to monitor various operating conditions of the engines and generators of the power generation systems 12; and to control various operating parameters of power generation systems 12.

Referring to FIG. 3, in a first embodiment, system controller 14 is operatively connected by line 58 to the utility to monitor the utility and to measure the voltage and current provided by the utility. In addition, system controller 14 is operatively connected by line 59 to supply line 40 to monitor the electrical power supplied by generators 20a and 20b. System controller 14 is also operatively connected to switches 61 and 63 by lines 65 and 67 in order to control the opening and closing of switches 61 and 63, for reasons hereinafter described. In an alternate embodiment, FIG. 2, system controller 14 is connected by line 69 to the utility to monitor the utility and to measure the voltage and current provided by the utility.

Figure 5:
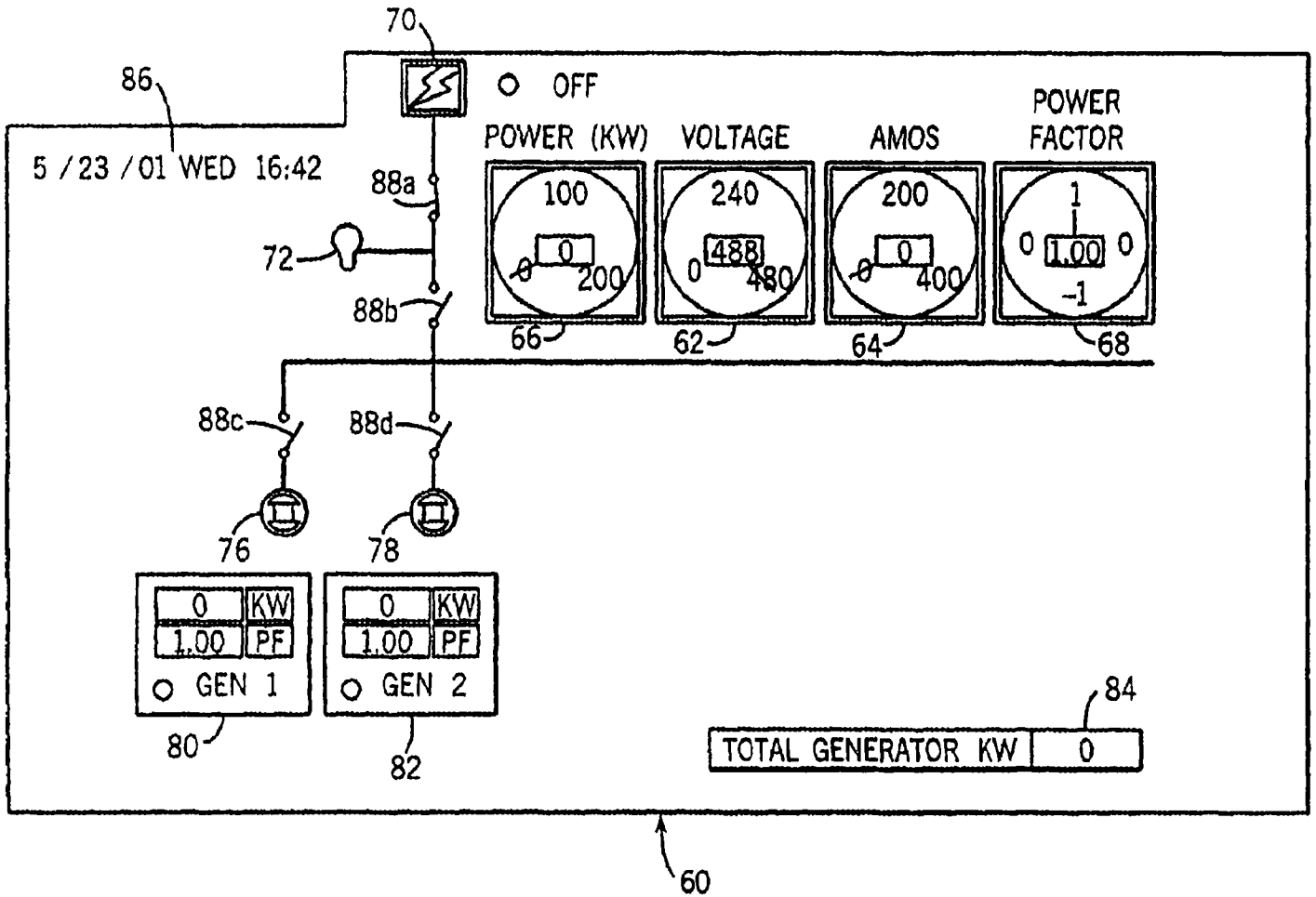
FIG. 5 is a display screen for monitoring the supply and distribution of electrical power provided by the power generation systems of FIGS. 1 and 2.

The magnitudes of the voltage and current provided by the utility are displayed on display screen 60, FIG. 5. Display screen 60 includes voltage display 62 for displaying the magnitude of the rms voltage provided by the utility and current display 64 for displaying the magnitude of the rms current provided by the utility. System controller 14 calculates the power supplied by the utility and power factor of the power supplied and displays the same on display screen 60 at power display 66 and power factor display 68, respectively.

Display screen 60 also includes utility icon 70 representing the utility, load icon 72 representing load 74, and generator icons 76 and 78 representing corresponding generators 20a and 20b, respectively. Generator power displays 80 and 82 are positioned adjacent corresponding generator icons 76 and 78, respectively, to display the power and power factor of the outputs of generators 20a and 20b. In addition, the total power provided by generators 20a and 20b is displayed by total power display 84. Display screen 60 also includes a time display 86 for displaying the date and time, as well as, power connections having switch icons 88a-d therein which represent the states of switches 61, 63, 44a and 44b, respectively, of FIG. 3.

Figure 6:
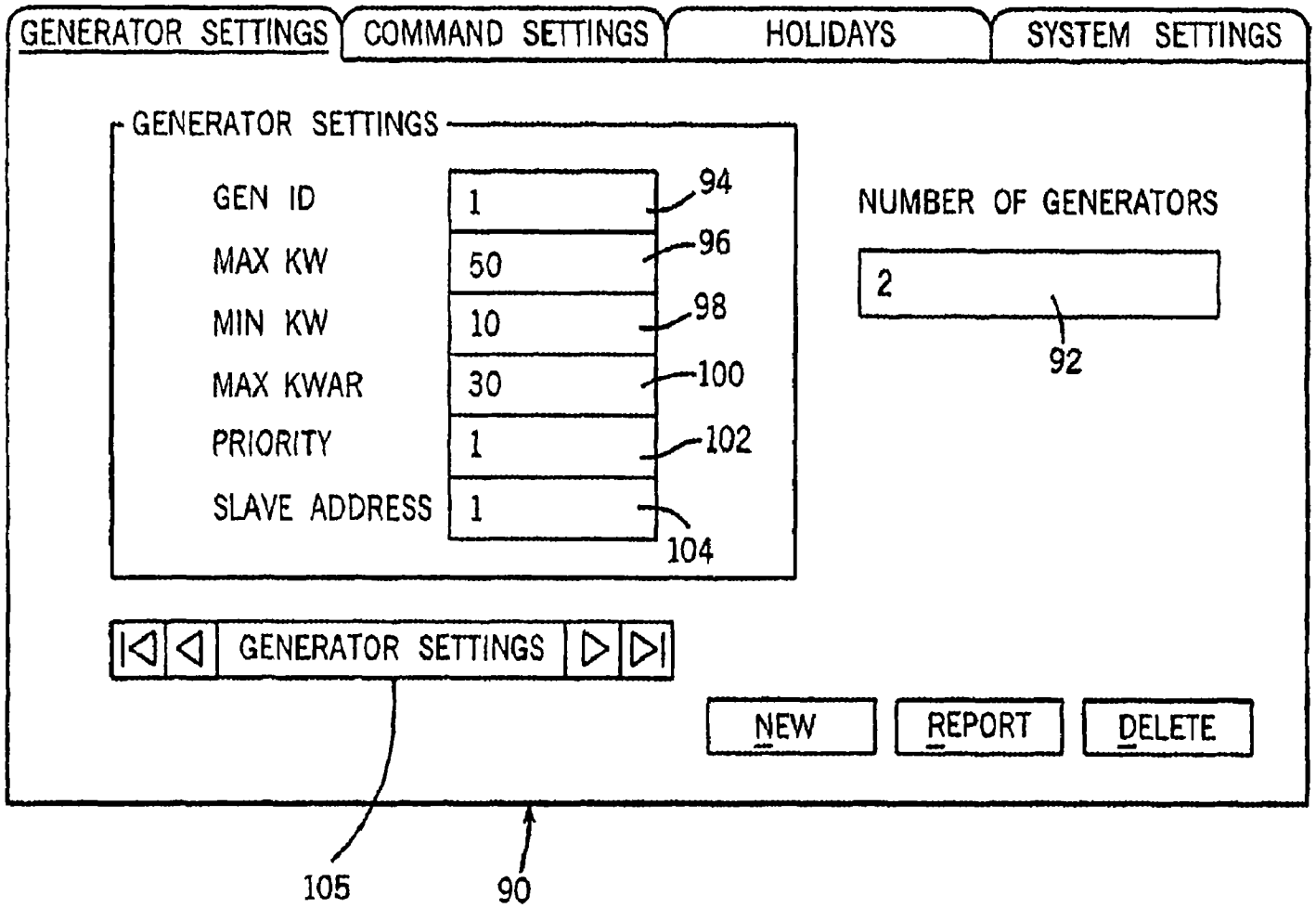
FIG. 6 is a generator settings display screen for allowing the user to provide the generator settings for the generator structure of FIG. 4.

System controller 14 further includes generator settings screen 90, FIG. 6, for allowing a user to input a plurality of settings for generators 20a and 20b. Generator setting screen 90 includes number-of-generators input 92 for allowing a user to input the number of generators connected to communications link 18. In addition, generator setting screen 90 includes inputs for identifying the generator (either generator 20a or generator 20b) for which the settings on the generator settings screen pertain 94; the maximum kilowatts produced by the identified generator 96; the recommended minimum kilowatts for efficient operation of the identified generator 98; the maximum power which may be produced by the identified generator in volt-ampere-reactance 100; the priority of operation of the identified generator as compared to the other generators of the power generation system 102; and a slave address for the generator control 42 of generator panel 16 for the identified generator 104. Generator settings scroll bar 105 is provided for allowing a user to scroll through the settings for each generator.

Figure 7:
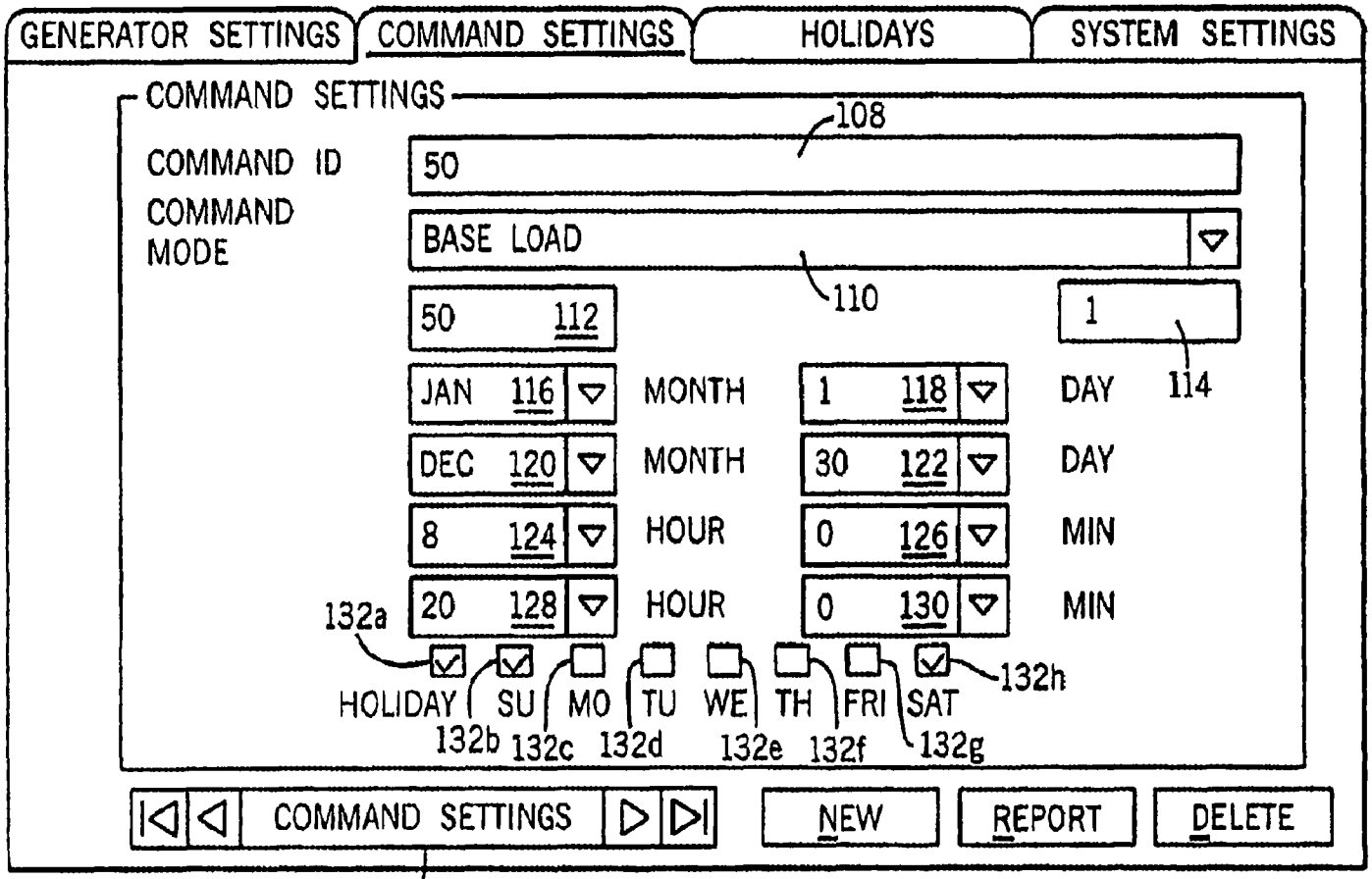
FIG. 7 is a command settings display screen for controlling the starting and stopping of the generator structure of FIG. 4.

Referring to FIG. 7, system controller 14 further includes a command settings screen generally designated by the reference numeral 106. Command settings screen 106 allows a user to input various parameters for starting and stopping generators 20a and 20b. Command settings screen 106 includes inputs for identifying: a command (by number) for operation of the generators (either generator 20a and generator 20b) 108; a mode the user desires the generators to operate during a prescribed time period 110; the maximum kilowatts to be produced by the generators or consumed from the utility during the prescribed time period depending on the mode selected by the user 112; and a user selected limit for the power factor of the electrical power produced by the generators or consumed from the utility during the prescribed time period depending on the mode selected by the user 114.

Command setting screen 106 also includes inputs for identifying the prescribed time period for which a user desires the generators to operate under the identified command. These inputs include a month 116 and a day 118 for starting the identified generator and a month 120 and a day 122 for stopping the generators. Inputs are also provided for an hour 124 and a minute 126 for starting the generators on each day for which the generators are intended to operate and an hour 128 and a minute 130 for stopping the generators on each day for which the generators are intended to operate. Inputs are also provided for identifying specific days of the week and holidays 132a-h during the prescribed time period for which the generators are intended not to operate. Command scroll bar 131 is provided for allowing the user to scroll through each command.

Figure 8:
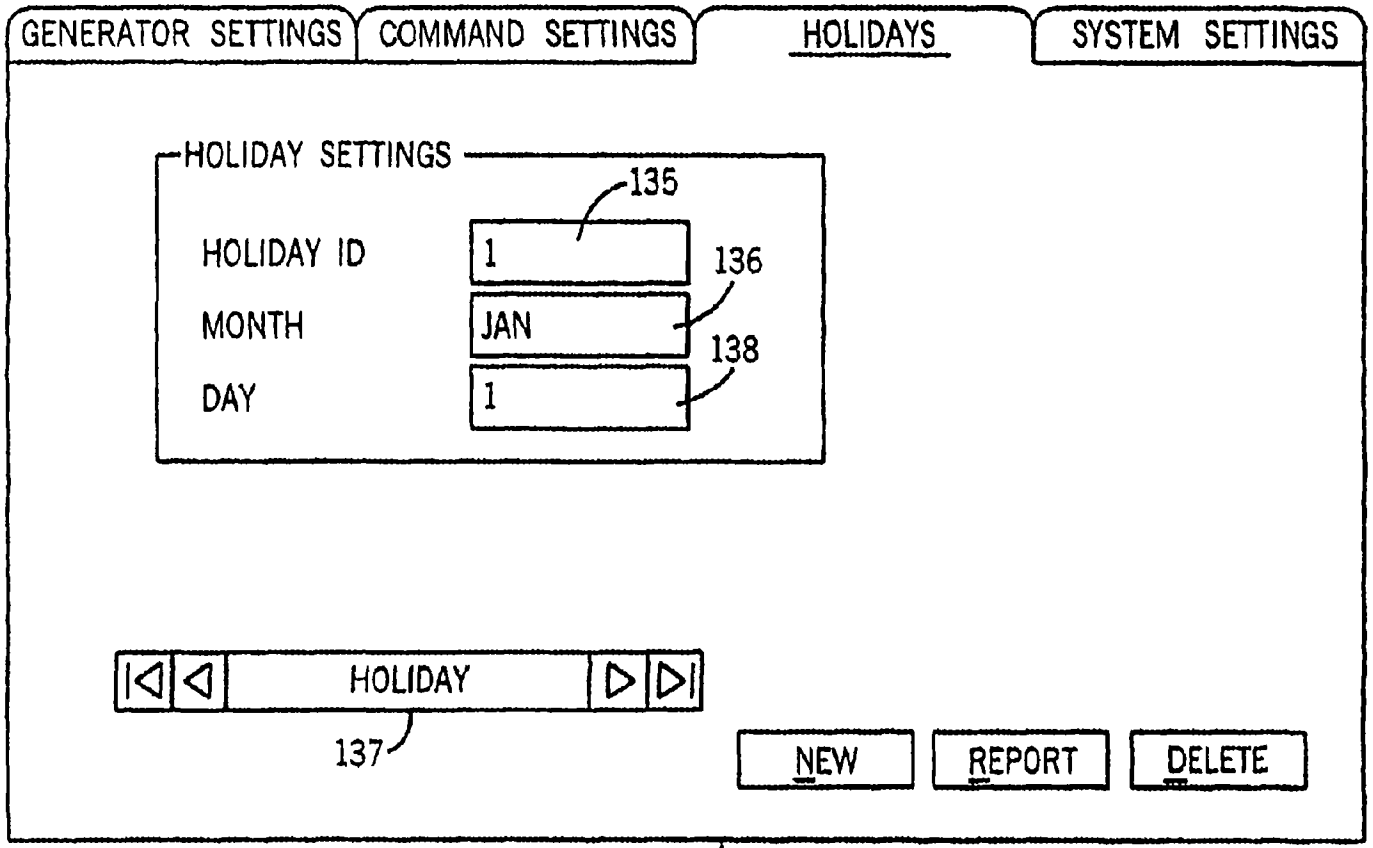
FIG. 8 is a holiday settings display screen for allowing a user to specify days on which the generator structure of FIG. 4 is not operated.

Referring to FIG. 8, system controller 14 further includes a holiday screen generally designated by the reference numeral 134. Holiday screen 134 includes inputs for a user: to identify holidays (by number) on which generators 20a and 20b will not be operational 135; and to specify a month 136 and a day 138 for each holiday identified. Holiday scroll bar 137 is provided for allowing the user to scroll through each holiday identified.

Figure 9:
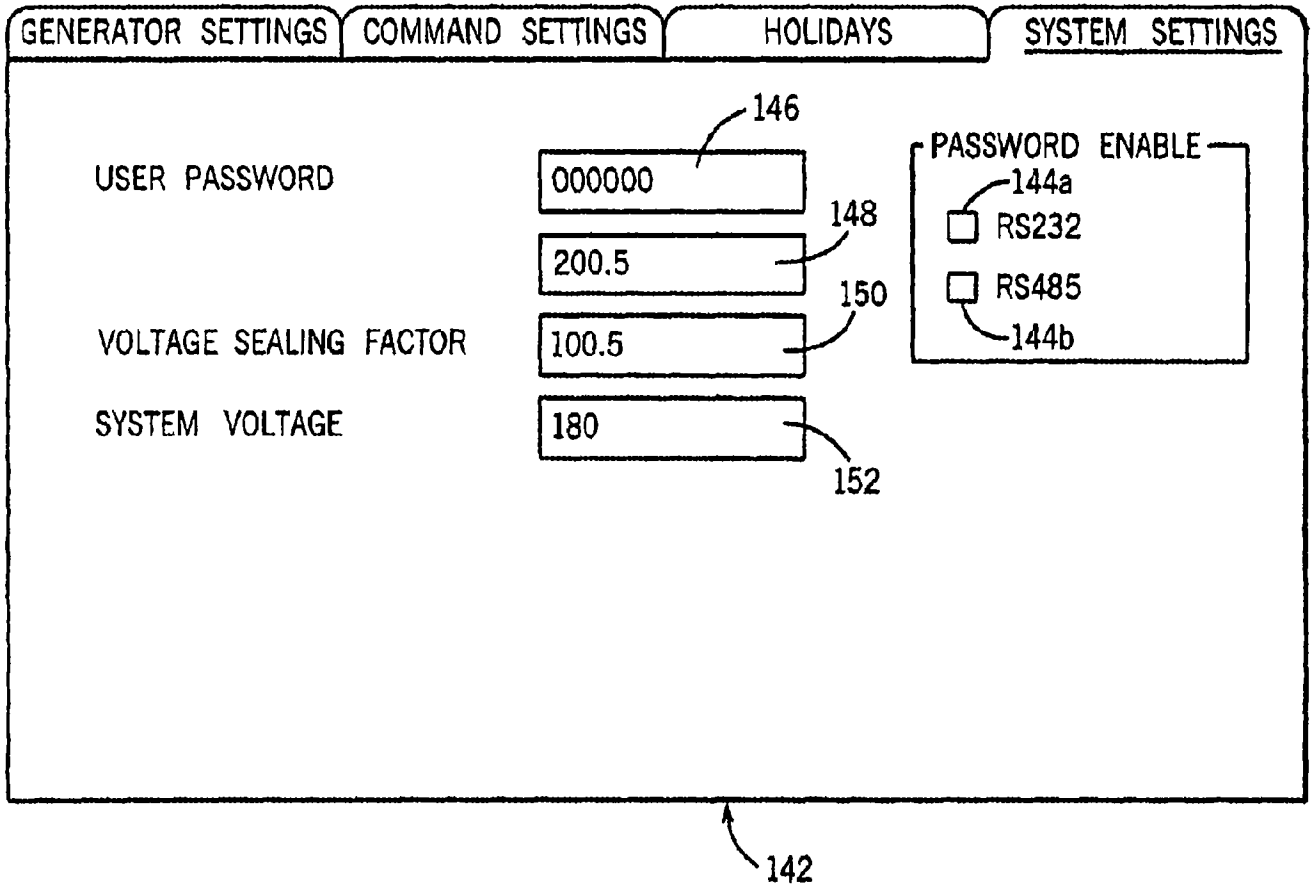
FIG. 9 is a system setting display screen for allowing the user to specify the settings of the power generation system of FIGS. 2-3.

As best seen in FIG. 9, system controller 14 includes a system settings screen generally designated by the reference numeral 142. System settings screen 142 includes inputs for a user: to specify if a password is needed 144a to connect system controller 14 to network 172, for reasons hereinafter described, and if a password is needed 144b to interconnect system controller 14 to serial communications link 18; to specify a password [146] which must be entered by a user *at input 146* to gain access to screens of FIGS. 6-10; to specify a current transformer ratio which steps down the current provided by utility so as to allow such current to be measured by the ammeter of system controller 14; to specify a voltage scaling factor to calibrate the volt meter which measures the voltage provided by the utility 150; and to specify a system voltage 152 to be generated by power generation system 12 (typically, the utility voltage).

Figure 10:
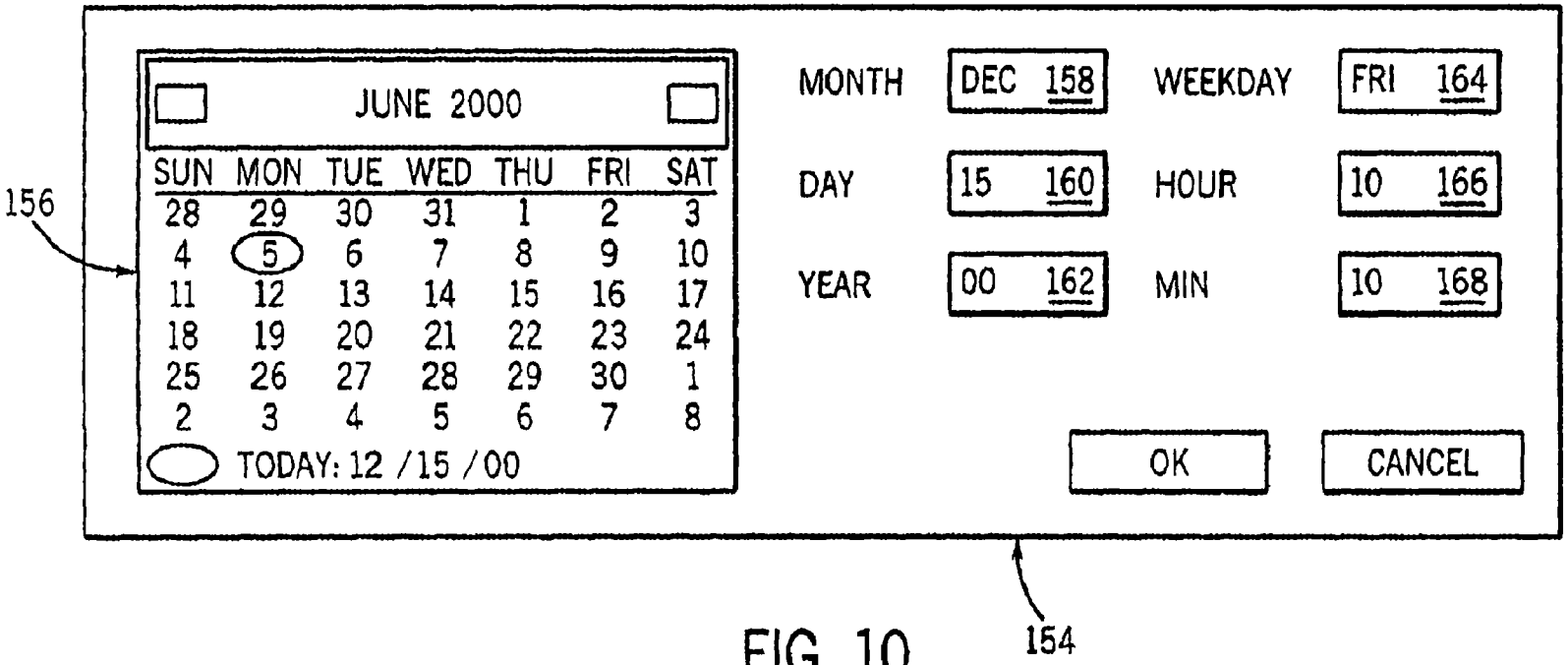
FIG. 10 is a clock programming screen for allowing a user to program a day and a time for use with the screens of FIGS. 5-9.

Referring to FIG. 10, a clock-programming screen is generally designated by the reference numeral 154. Clock programming screen 154 includes a scrollable calendar display 156 for displaying a calendar to a user. In addition, the clock-programming screen 154 includes inputs for allowing a user to specify the month 158, the day of the month 160, the year 162, the weekday 164, the hour 166 and the minute 168. The day and time inputted on clock-programming screen 154 are displayed by time display 86 on display screen 60.

In operation, for each power generation system 12, generator panels 16 and system controller 14 are connected to a common serial communications link 18. Initially, a user inputs a plurality of settings for generators 20a and 20b on generator settings screen 90 and the various parameters for starting and stopping generators 20a and 20b on command settings screen 106 of system controller 14, as heretofore described. In addition, the user enters the inputs heretofore described on holiday screen 134, system settings screen 142, and clock programming screen 154 of system controller 14. Thereafter, in order to gain access to the various screens of system controller 14, the user is prompted to enter the password provided at input 146 of system settings screen 142. After obtaining access to the various screens of system controller 14, the user may monitor power generation system 12 and/or may vary the inputs, as heretofore described.

With respect to power generation systems 12 of FIGS. 1-2 and 4b, system controller 14 monitors the electrical power supplied to supply line 40 by the utility. The magnitude of the rms voltage provided by the utility and the magnitude of the rms current provided by the utility are displayed on display screen 60, FIG. 5. In addition, the power supplied by the utility and power factor of the power supplied are displayed on display screen 60. Further, display screen 60 displays the date and time, as well as, the power connections of power generation system 12.

If the electrical power from the utility fails, generator controls 42 of generator panels 16 start engines 22 such that generators 20a and 20b generate electrical power, as heretofore described. When the electrical power generated by generators 20a and 20b reaches the magnitude and frequency desired by the user, transfer switches 38 transfer loads 34 and 36 from supply line 40 to corresponding outputs 31 of generators 20a and 20b, respectively. The power and power factor of the outputs of generators 20a and 20b, as well as, the total power provided by generators 20a and 20b to loads 34 and 36, respectively, are displayed on display screen 60. Display screen 60 also updates the power connections of power generation system 12.

In response to restoration of electrical power on supply line 40 by the utility, generator controls 42 of generator panels 16 cause transfers switches 38 to transfer loads 34 and 36 from outputs 31 of generators 20a and 20b, respectively, to the utility connected to supply line 40. Thereafter, generator controls 42 stop corresponding engines 22 such that generators 20a and 20b no longer generate electrical power.

Alternatively, generators 20a and 20b may be placed in parallel with a utility by connecting outputs 31 of generators 20a and 20b to the utility through supply line 40. As heretofore described, in order to put generators 20a and 20b in parallel with the utility, it is necessary to match the magnitudes of the AC output voltages of generators 20a and 20b with the magnitude of the AC voltage of the utility. In addition, the outputs of generators 20a and 20b must be synchronized with the utility such that the phase sequences and the frequencies of the outputs of generators 20a and 20b are identical in phase and frequency with the utility.

Once the outputs of generators 20a and 20b are synchronized with the utility and the magnitudes of the AC output voltages of generators 20a and 20b match of the AC voltage of the utility, generator controls 42 of generator [powers] *panels* 16 cause transfer switches 38 to close such that loads 34 and 36 are operatively connected to the utility through supply line 40 and to outputs 31 of generators 20a and 20b, respectively. The AC power and power factor provided by generators 20a and 20b, as well as, the total power provided by generators 20a and 20b, respectively, are displayed on display screen 60. Display screen 60 also updates the power connections of power generation system 12. It can be appreciated that generator controls 42 of generator panels 16 control the power factors of the electrical power supplied by corresponding generators 20a and 20b and the AC power supplied by generators 20a and 20b, as heretofore described, in accordance with the inputs provided by a user on command settings screen 106.

Referring to the embodiment of FIGS. 3 and 4a in the event of a power outage, system controller 14 advises each of generator controls 42 of generator panels 16 accordingly. Generator controls 42 of generator panels 16 start engines 22 such that generators 20a and 20b generate electrical power, as heretofore described. When the electrical power generated by generators 20a and 20b reaches the magnitude and frequency desired by the user, transfer switches 44a and 44b close so as to connect supply line 40 to corresponding outputs 31 of generators 20a and 20b, respectively. Thereafter, system controller 14 opens switch 61 and closes switch 63 in order to connect supply line to load 74, and to hence, transfer load 74 from the utility to generators 20a and 20b. The power and power factor provided by generators 20a and 20b, as well as, the total power provided by generators 20a and 20b to load 74, are displayed on display screen 60. Display screen 60 also updates the power connections of power generation system 12.

In response to restoration of electrical power by the utility, system controller 14 advises generator controls 42 of generator panels 16 accordingly. Thereafter, system controller 14 closes switch 61 and opens switch 63 in order to connect the utility to load 74. In addition, generator controls 42 of generator panels 16 open transfer switches 44a and 44b so as to disconnect the outputs 31 of generators 20a and 20b, respectively, from supply line 40. Generator controls 42 stop corresponding engines 22 such that generators 20a and 20b no longer generate electrical power, or alternatively, system controller 14 returns to operating generators 20a and 20b, as provided by a user on command setting screen 106 Display screen 60 updates the information displayed thereon accordingly.

Alternatively, generators 20a and 20b may be placed in parallel with the utility by connecting outputs 31 of generators 20a and 20b to the utility through supply line 40. As heretofore described, in order to put generators 20a and 20b in parallel with the utility, it is necessary to match the magnitudes of the AC output voltages of generators 20a and 20b with the magnitude of the AC voltage of the utility. In addition, the outputs of generators 20a and 20b must be synchronized with the utility such that the phase sequences and the frequencies of the outputs of generators 20a and 20b are identical in phase and frequency with the utility.

Once the outputs of generators 20a and 20b are synchronized with the utility and the magnitudes of the AC output voltages of generators 20a and 20b match of the AC voltage of the utility, transfer switches 44a and 44b close such that outputs 31 of generators 20a and 20b are connected to supply line [74] *40*. Thereafter, system controller 14 closes switch 63 in order to connect supply line 40 to the utility and to load 74. The power and power factor provided by generators 20a and 20b, as well as, the total power provided by generators 20a and 20b to load 74, are displayed on display screen 60. Display screen 60 also updates the power connections of power generation system 12.

It is contemplated that system controller 14 incorporate a load shedding feature such that if the electrical power from the utility fails and if the plurality of generators in power generation system 12 are inadequate to provide sufficient electrical power to support load 74, system controller 14 may disconnect a portion of load 74 from supply line 40. A circuit breaker with a shunt trip is provided in series with portions of load 74. If the electrical power from the utility fails, system controller 14 trips the circuit breaker and removes a corresponding portion of load 74 from the system. It is contemplated that multiple load shedding relays be provided and the system controller 14 only shed such portion of load 74 as necessary to allow the generators of power generation system 12 to provide adequate electrical power to the load. By way of example, if one or more of the plurality of electrical generators of power generation system 12 are off line, additional portions of the load may be shed in order to for the generators in operation to provide adequate electrical power to load 74.

Referring back to FIG. 1, it is contemplated that network system 10 include a network controller 170 which is operatively connected to a communication network 172 such as a telephone network, a computer network, the internet, or a combination for communication thereon. Network controller *170* includes a microprocessor and one or more visual displays. It is further contemplated to interconnect systems controller 14 to *the communication* network 172, as heretofore described. It is contemplated that the microcontroller of network controller [172] *170* execute a software program so as to allow a user to access each system controller 14 and selectively display the screens, FIGS. 5-10 of the selected system controller 14 on the visual display of the network controller 170. As such, the network system 10 allows for a single user to monitor several power generation systems 12 from a single locale and to control operation of these power generation systems 12 in the heretofore described. Consequently, a user is able to view the current operating conditions of each of the power generation systems 12, as well as, configure system controllers 14 from the remote locale. In addition, the user can obtain detailed information from individual generators 20a and 20b from the remote locale.

Various modes of carrying out the invention are contemplated as being within the scope of the following claims particularly pointing out and distinctly claiming the subject matter which is regarded as the invention.

We claim:

1. A control system for controlling operation of an engine-driven, electrical generator which generates AC power and AC voltage having a magnitude and a frequency for a load, the load being operatively connected to a utility source which provides AC power having a magnitude and power factor and AC voltage having a magnitude and a frequency thereto, and the engine having an adjustable engine speed, comprising:

a generator control operatively connected to the engine for controlling operation thereof and operatively connected to the generator for controlling the AC power generated thereby;

a synchronizer operatively connected to [a] *the* generator control, the synchronizer monitoring the magnitude and frequency of the AC voltage of the utility source and the magnitude and frequency of the AC voltage generated by the generator; and a communications link for operatively connecting the generator control to a network;

wherein the generator control adjusts the magnitude of the AC voltage generated by the generator and adjusts the engine speed of the engine to vary the frequency of the AC voltage generated by the generator such that the magnitude and frequency of the AC voltage generated by the generation matches the magnitude and frequency of the AC voltage of the utility source.

2. The control system of claim 1 further comprising a user interface operatively connected to the network, the user interface allowing a user to communicate with *the* generator control so as to set predetermined operating parameters of the engine and the generator.

3. The control system of claim 1 further comprising a transfer switch having a first input connectable to the utility source for providing AC power, a second input operatively connected to the generator, and an output connectable to an alternate load, the transfer switch is selectively movable between a first position connecting the utility source to the alternate load and a second position connecting the generator to the alternate load.

4. The control system of claim 3 wherein the transfer switch is operatively connected to the generator control such that the generator control controls movement of the transfer switch between the first and second positions.

5. The control system of claim 1 further comprising a switch operatively connected to the generator control and being movable between a first closed position for interconnecting the generator and the load and a second open position, the generator control moving the switch to the closed position in response to the magnitude and frequency of the AC voltage generated by the generator being generally equal to the magnitude and frequency of the AC voltage provided by the utility source.

6. The control system of claim 1 wherein the generator control includes a digital governor connectable to the engine for controlling the engine speed of the engine.

7. The control system of claim 6 wherein the digital governor includes a throttle valve, the throttle valve movable between a first open position wherein the engine generates maximum AC power and a second closed position wherein the engine generates minimum AC power.

8. The control system of claim 1 wherein the generator control includes a voltage regulator for controlling the magnitude of the AC voltage generated by the generator.

9. The control system of claim 1 further comprising an alarm system connectable to the engine for monitoring various engine parameters, the alarm system communicating with the generator control and generating an alarm signal in response to a predetermined condition on the engine.

10. A generator structure for generating AC power for a load, the load including a utility source which provides AC power having a magnitude and power factor and AC voltage having a magnitude and frequency, comprising:

a generator connectable to the load, the generator generating AC power having a magnitude and a power factor and AC voltage having a magnitude and a frequency;

an engine operatively connected to the generator for driving the generator, the engine having an adjustable engine speed;

a generator control operatively connected to the engine for controlling operation thereof and operatively connected to the generator for controlling the AC power generated thereby, the generator control including a synchronizer for monitoring the magnitude and frequency of the AC voltage provided by the utility source and the magnitude and frequency of the AC voltage generated by the generator wherein the generator control adjusts the magnitude of the AC voltage generated by the generator and adjusts the engine speed of the engine to vary the frequency of the AC voltage generated by the generator such that the magnitude and frequency of the AC voltage generated by the generator the magnitude and frequency of the AC voltage of the utility source; and a communications link for operatively connecting the generator control to a network.

11. The generator structure of claim 10 further comprising a transfer switch having a first input connectable to a utility source for providing AC power, a second input operatively connected to the generator, and an output connectable to an alternate load, the transfer switch selectively movable between a first position for connecting the utility source to the alternate load and a second position for connecting the generator to the alternate load.

12. The generator structure of claim 11 wherein the transfer switch is operatively connected to the generator control such that the generator control controls movement of the transfer switch between the first and second positions in response to the AC power supplied by the utility source.

13. The generator structure of claim 10 further comprising a switch operatively connected to the generator control and being movable between a first closed position wherein the generator is connected to the utility source and a second open position, the generator control moving the switch to the closed position in response to the magnitude and frequency of the AC voltage generated by the generator being generally equal to the magnitude and frequency of the AC voltage provided by the utility source.

14. The generator structure of claim 10 wherein the generator control includes a digital governor connectable to the engine for controlling the engine speed of the engine.

15. The generator structure of claim 14 wherein the digital governor includes a throttle valve, the throttle valve movable between a first open position wherein the engine generates maximum AC power and second closed position wherein the engine generates minimum AC power.

16. The generator structure of claim 10 wherein the generator control includes a voltage regulator for regulating the magnitude of the AC voltage generated by the generator.

17. A control system for controlling operation of an engine-driven, electrical generator which generates AC power and AC voltage having a magnitude and a frequency for a load, the load being operatively connected to a utility source which provides AC power having a magnitude and power factor and AC voltage having a magnitude and a frequency thereto, and the engine having an adjustable engine speed, comprising:

a generator control operatively connected to the engine for controlling operation thereof and operatively connected to the generator for controlling the AC power generated thereby, the generator control including a volt-ampere-reactive (VAR) control for varying the power factor of the AC power generated by the generator to a predetermined value;

a synchronizer operatively connected to [a] *the* generator control, the synchronizer monitoring the magnitude and frequency of the AC voltage of the utility source and the magnitude and frequency of the AC voltage generated by the generator; and a communications link for operatively connecting the generator control to a network;

wherein the generator control varies the magnitude and frequency of the AC voltage generated by the generator to match the magnitude and frequency of the AC voltage of the utility source.

18. A generator structure for generating AC power for a load, the load including a utility source which provides AC power having a magnitude and power factor and AC voltage having a magnitude and frequency, comprising:

a generator connectable to the load, the generator generating AC power having a magnitude and a power factor and AC voltage having a magnitude and a frequency;

an engine operatively connected to the generator for driving the generator, the engine having an adjustable engine speed;

a generator control operatively connected to the engine for controlling operation thereof and operatively connected to the generator for controlling the AC power generated thereby, the generator control including a volt-ampere-reactive (VAR) control for varying the power factor of the AC power generated by the generator;

the generator control including a synchronizer for monitoring the magnitude and frequency of the AC voltage provided by the utility source and the magnitude and frequency of the AC voltage generated by the generator such that the generator control the magnitude and frequency of the AC voltage generated by the generator the magnitude and frequency of the AC voltage of the utility source; and a communications link for operatively connecting the generator control to a network.

19. A method of providing AC power to a load, the load including a utility source which provides AC power having a magnitude and a power factor and an AC voltage having a magnitudes and a frequency, comprising the steps of:

setting various operating parameters for a generator structure and transmitting the same to the generator structure over a network; and generating AC power and AC voltage with a generator structure in response to the various operating parameters set, the AC power having a magnitude and a power factor and the AC voltage having a magnitude and a frequency;

monitoring the magnitude and the frequency of the AC voltage provided by the utility source and the magnitude and the frequency of the AC voltage generated by the generator structure;

varying the magnitude and the frequency of the AC voltage generated by the generator structure to match the magnitude and the frequency of the AC voltage provided by the utility source, and interconnecting the generator structure to the utility source in response to the magnitude and the frequency of the AC voltage generated by the generator structure being generally equal to the magnitude and the frequency of the AC voltage provided by the utility source.

20. The method of claim 19 comprising the additional step of varying the power factor of the AC power generated by the generator structure to a predetermined value.

21. The method of claim 19 comprising the additional step of adjusting the magnitude of the AC voltage generated by the generator structure to a user selected magnitude.

* * * * *